United States Patent
Koyama

(10) Patent No.: US 7,738,703 B2
(45) Date of Patent: Jun. 15, 2010

(54) IMAGE PROCESSING APPARATUS, IMAGE PROCESSING METHOD AND COMPUTER READABLE MEDIUM STORING IMAGE PROCESSING PROGRAM

(75) Inventor: Toshiya Koyama, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 950 days.

(21) Appl. No.: 11/517,517

(22) Filed: Sep. 8, 2006

(65) Prior Publication Data
US 2007/0206863 A1    Sep. 6, 2007

(30) Foreign Application Priority Data
Mar. 1, 2006   (JP) ............... 2006-054345

(51) Int. Cl.
*G06K 9/34*    (2006.01)
(52) U.S. Cl. .................................. 382/176
(58) Field of Classification Search .......... 382/175, 382/180, 305, 306; 707/1, 100, 101, 104.1, 707/204, 205
See application file for complete search history.

(56) References Cited

U.S. PATENT DOCUMENTS

| | | | | |
|---|---|---|---|---|
| 5,020,122 A | * | 5/1991 | Walsh et al. | 382/236 |
| 5,040,227 A | * | 8/1991 | Lyke et al. | 382/138 |
| 7,373,365 B2 | * | 5/2008 | Varadarajan et al. | 707/204 |

FOREIGN PATENT DOCUMENTS

| | | |
|---|---|---|
| JP | A 2003-115039 | 4/2003 |
| JP | A 2004-213230 | 7/2004 |
| JP | A 2004-341914 | 12/2004 |
| JP | A 2005-149097 | 6/2005 |

* cited by examiner

*Primary Examiner*—Jose L Couso
(74) *Attorney, Agent, or Firm*—Oliff & Berridge, PLC

(57) ABSTRACT

An image processing apparatus includes: a first memory that stores a first document file; a second memory that stores a second document file obtained by revising the first document file; an extraction unit that extracts a revised area of the second document file based on the first document file corresponding to the second document file and the second document file; and an extracted area specifying file generation unit that generates a file specifying the revision area extracted by the extraction unit.

21 Claims, 9 Drawing Sheets

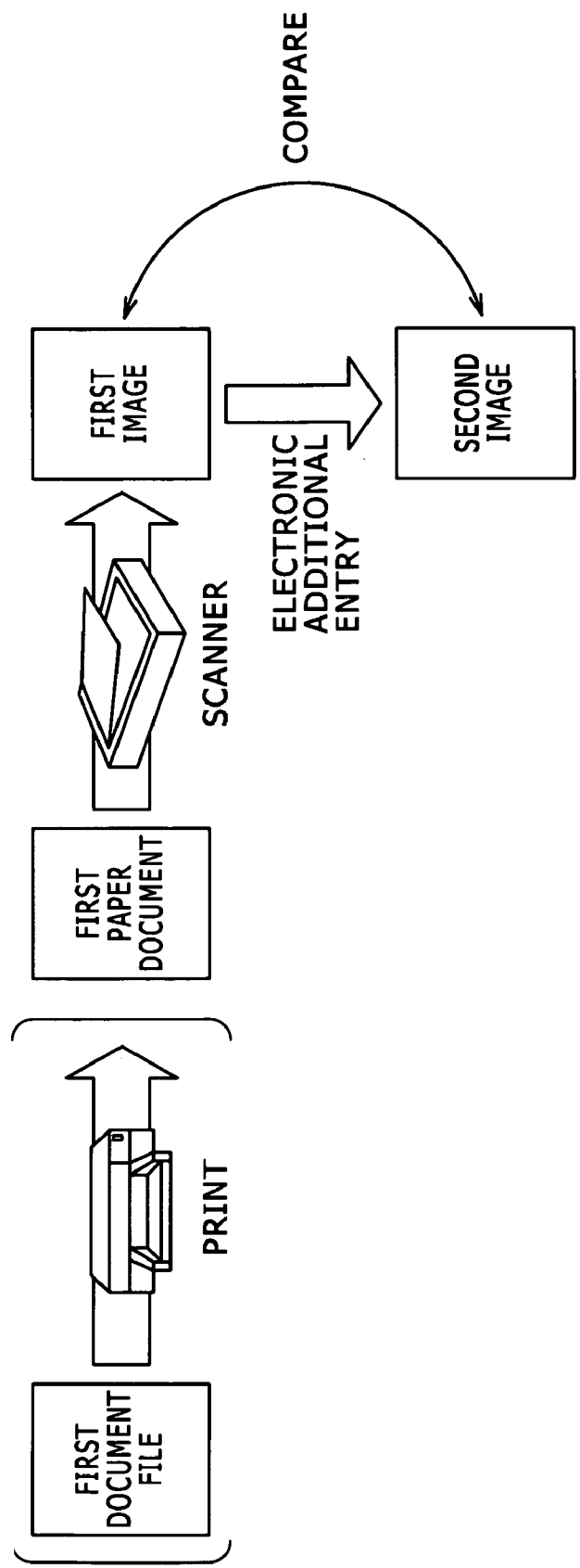

IMAGE PROCESSING APPARATUS, IMAGE PROCESSING METHOD AND COMPUTER READABLE MEDIUM STORING IMAGE PROCESSING PROGRAM

BACKGROUND

1. Technical Field

The present invention relates to an image processing apparatus, an image processing method and a computer readable medium storing an image processing program.

2. Related Art

In the field of image processing, various studies and developments are made about extraction of a user's additional entry (revision) to a document outputted from e.g. a printer or a FAX (facsimile machine).

SUMMARY

According to an aspect of the invention, there is provided an image processing apparatus including: a first memory that stores a first document file; a second memory that stores a second document file obtained by revising the first document file; an extraction unit that extracts a revised area of the second document file based on the first document file corresponding to the second document file and the second document file; and an extracted area specifying file generation unit that generates a file specifying the revision area extracted by the extraction unit.

BRIEF DESCRIPTION OF THE DRAWINGS

Exemplary embodiments of the present invention will be described in detail based on the following figures, wherein:

FIG. 12 is a conceptual diagram showing an electronic additional entry processing pattern 4.

DETAILED DESCRIPTION

Hereinbelow, an exemplary embodiment of the present invention will be described in detail with reference to the drawings.

Figure 1:
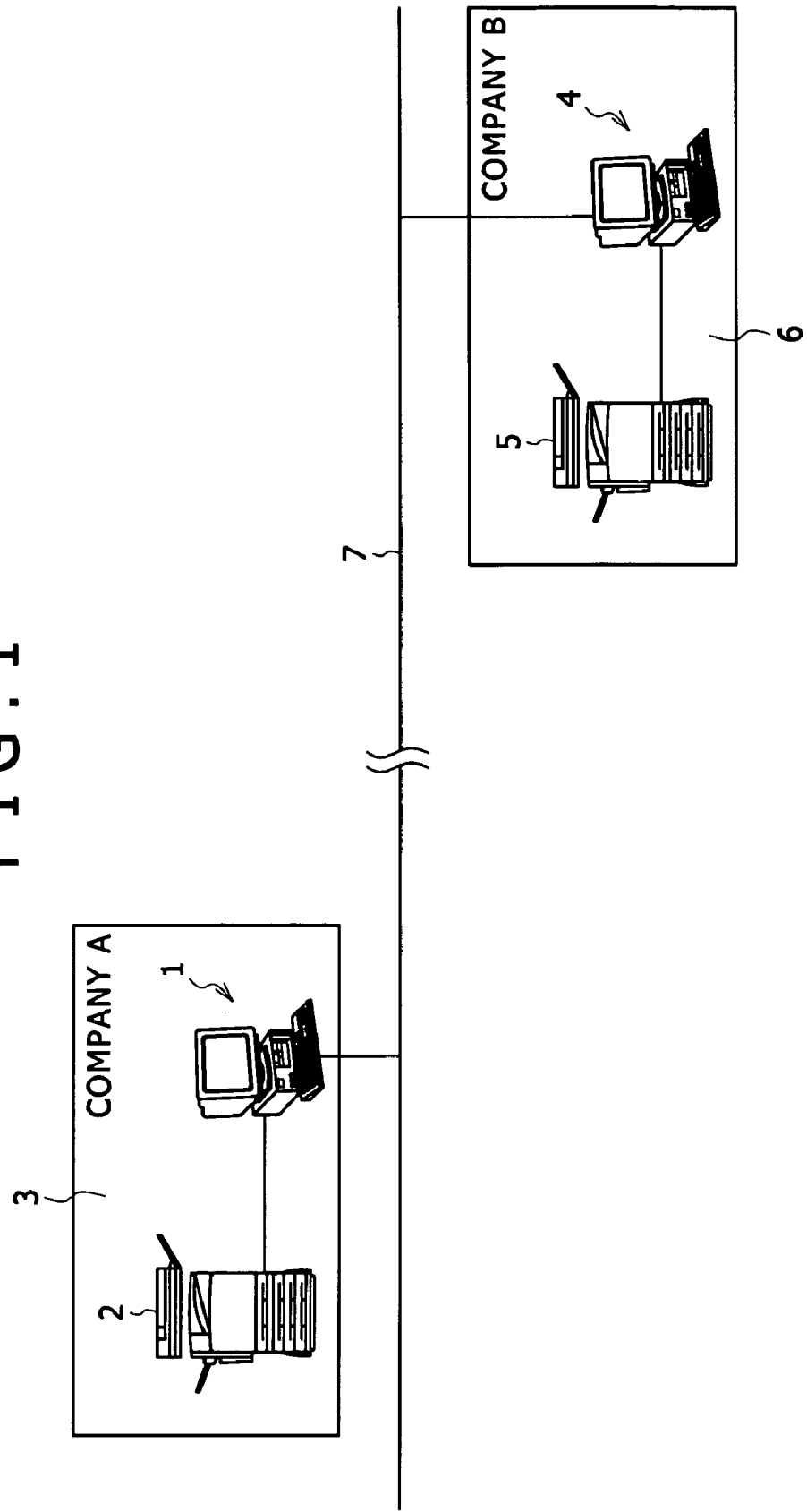
FIG. 1 schematically illustrates the system configuration of an image information processing system to which the present invention is applied.

FIG. 1 schematically illustrates the system configuration of an image information processing system to which the present invention is applied. In the image information processing system according to this example, a paper document, a document file computerized from the paper document or image data subjected to imaging (rasterized) from the document file is transmitted/received between remote places, for example, between a company A and a company B.

In FIG. 1, the company A has an image processing apparatus 3 having a personal computer (hereinbelow, abbreviated to "PC") 1, and a multifunction device 2 as a peripheral device connected with the PC 1, having respective functions such as a scan function, a printing function and a facsimile (FAX) function. The company B has an image processing apparatus 6 having a PC 4 and a multifunction device 5. The PC 1 of the image processing apparatus 3 on the company A side and the PC 4 of the image processing apparatus 6 on the company B side are mutually communicably connected via a network 7 such as the Internet.

Note that the system has the multifunction devices 2 and 5 as peripheral devices of the PCs 1 and 4, however, the system may be configured to have a scanner, a printer a facsimile apparatus in accordance with necessity. Further, the number of the PCs of the companies A and B is not limited to one but plural PCs may be employed.

In the image information processing system having the above configuration, in the present exemplary embodiment, a system configuration will be described in an example when the company B requests the company A to conduct a desired search, then the company A makes an entry of the search result into a search report provided from the company B and sends the search report to the company B, and the search result entered in the search result is inputted into the PC on the company B side.

The transmission/reception of the search report between the company B and the company A, the search report may be transmitted in the form of paper document, or a document file computerized from the paper document, or image data subjected to imaging (rasterized) from the document file.

Figure 2:
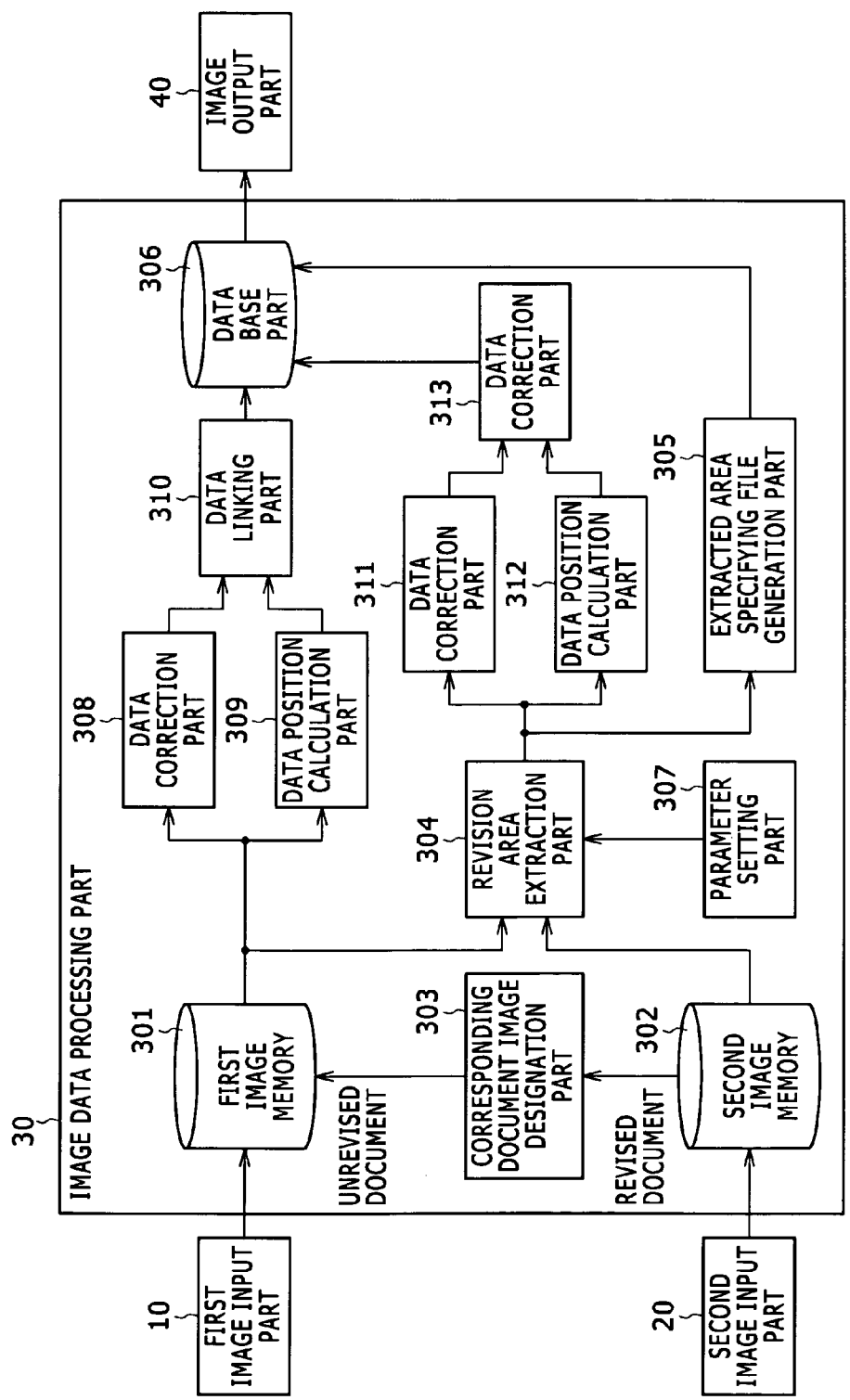
FIG. 2 is a block diagram showing the construction of an image processing apparatus according to an exemplary embodiment of the present invention.

FIG. 2 is a block diagram showing the construction of an image processing apparatus according to the exemplary embodiment of the present invention. The image processing apparatus according to the present exemplary embodiment corresponds to the image processing apparatus 6 on the company B side in the image information processing system having the above configuration.

As shown in FIG. 2, the image processing apparatus according to the present exemplary embodiment has a first image input part 10, a second image input part 20, an image data processing part 30 and an image output part 40.

The first image input part 10 corresponds to an image reading part (scanner) of the multifunction device 5 in FIG. 1. The first image input part 10 reads a paper document before revision (hereinbelow, referred to as an "unrevised document") as a first document, and inputs the read document as image data into the image data processing part 30. Note that when the first revision is performed on a completed paper, the completed paper document is an unrevised document before the first revision (first completed document), then when the second revision is performed, the once-revised document is an unrevised document after the first revision, and the same cycle goes on for subsequent documents.

The second image input part 20 corresponds to e.g. the image reading part of the multifunction device 5. The second image input part 20 reads a paper document after revision (hereinbelow, referred to as a "revised document") as a second document and inputs the read document as image data into the image data processing part 30. Note that when the first revision is performed, the revised document is a paper document after first revision (first edition), then when the second revision is performed, the revised document is a paper document after second revision (second edition), when the third revision is performed, the revised document is a paper document after third revision (third edition), and the same cycle goes on for subsequent documents.

Note that in this example, the company A sends a revised document to the company B via mail, and the sent revised document is subjected to imaging by the second image input part 20 on the company B side and inputted into the image data processing part 30. In this case, the image reading part of the multifunction device 5 in FIG. 1 is used in common as the first and second image input parts 10 and 20.

On the other hand, it may be arranged such that the revised document is subjected to imaging by the image processing apparatus 3 on the company A side, and the image data is transmitted via the network 7 to the image processing apparatus 6 on the company B side. In this case, a data communication unit, which receives the image data on the revised document transmitted via the network 7 from the image processing apparatus 3 on the company A side and inputs the data into the image data processing part 30, corresponds to the second image input part 20.

The image data processing part 30 has first and second image memories 301 and 302, a corresponding document image designation part 303, a revision area extraction part 304, an extracted area specifying file generation part 305, a database part 306, a parameter setting part 307, a data correction part 308, a data position calculation part 309, a data linking part 310, a data correction part 311, a data position calculation part 312 and a data correction part 313.

In the image data processing part 30, the first image memory 301 stores image data of an unrevised document inputted by the first image input part 10. The second image memory 302 stores image data of a revised document inputted by the second image input part 20. Note that in this example, the first and second image memories 301 and 302 are separate constituent elements, however, it may be arranged such that the same storage device is used in common, and two storage areas separately set in the storage device are used as the first and second memories 301 and 302.

The corresponding document image designation part 303 analyzes e.g. code information included in image data of a revised document read from the second image memory 302, designates image data of an unrevised document corresponding to the image data of the revised document with respect to the first image memory 301, and reads the image data of the unrevised document from the first image memory 301.

As the corresponding document image designation part 303, for example, an operation part (not shown) operated by a user may be used. In this case, the user manually designates image data of an unrevised document corresponding to image data of a revised document. Note that the operation of the corresponding document image designation part 303 is not limited to the user's manual designation but a structure to automatically search for image data of an unrevised document corresponding to the image data of the revised document may be employed.

More particularly, file names associated with each other may be assigned to both image data of the unrevised document and the revised document, so as to automatically perform a search for image data of unrevised documents having the same or similar name from a file name assigned to image data of a revised document. Further, a file name may be extracted from code information such as a barcode or QR code (registered trademark) included in image data of a revised document. Further, the code information such as a barcode or QR code included in the image data of the revised document may be compared with a database in the database part 306 so as to find a file.

The revision area extraction part 304 compares image data of an unrevised document designated by the corresponding document image designation part 303 with image data of a revised document corresponding to the image data of the unrevised document, thereby extracts an area where revision has been made (hereinbelow, referred to as a "revision area") from the revised document. The unit of the revision area may be a revised character, a numeral or the like, or may be a group of characters, numerals or the like. Further, the unit may be a pixel.

(Revision Area Extraction Part)

Figure 3:
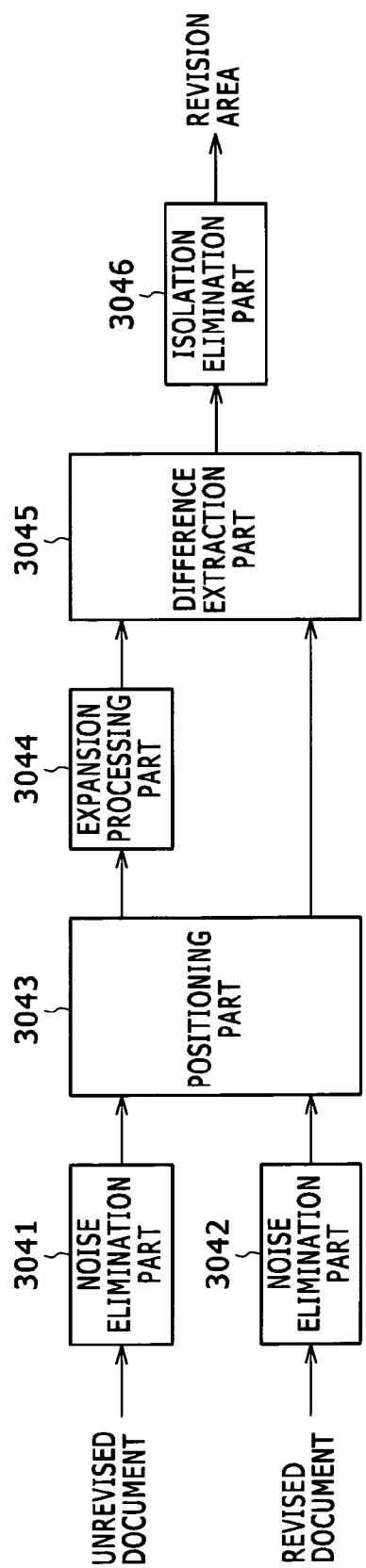
FIG. 3 is a block diagram showing the construction of a revision area extraction part.

FIG. 3 shows the construction of the revision area extraction part 304. As shown in FIG. 3, the revision area extraction part 304 according to this example has noise elimination parts 3041 and 3042, a positioning part 3043, an expansion processing part 3044, a difference extraction part 3045 and an isolation elimination part 3046.

The noise elimination part 3041 eliminates noise included in image data of an unrevised document. The noise elimination part 3042 eliminates noise included in image data of a revised document. In these noise elimination parts 3041 and 3042, noise elimination processing is performed based on a parameter determining the degree of noise elimination.

The positioning part 3043 corrects a relative positional shift between two images of unrevised document and revised document, thereby performs positioning between the both images. More particularly, image conversion using correction parameters is performed on one of the image data, thereby relative positioning between the two images is performed. The positioning part 3043 uses affine transformation using e.g. a widthwise directional moving amount (X), a vertical directional moving amount (Y), a rotational angle ($\theta$), magnification ($\beta$) as positioning correction parameters.

The expansion processing part 3044 performs expansion processing (heavy-line processing) on the image data of the unrevised document from the positioning part 3043. In the expansion processing, the image data of the unrevised document is expanded by several pixels. In the expansion processing part 3044, the expansion processing is performed based on a parameter determining the degree of expansion.

The difference extraction part 3045 performs processing (difference processing) to subtract the image data of the unrevised document subjected to the expansion processing by the expansion processing part 3044, from the image data of the revised document from the positioning part 3043, and outputs the result of difference extraction as revision (additional entry) information. The extraction of revision information may be performed by using a well-known technique.

The difference extraction technique is to detect the existence/absence of difference between the xy coordinate position of image data of an original document (unrevised document) and the xy coordinate position of image data of additionally-inscribed document (revised document), and to extract the difference as additional entry information only when a difference exists. Pixel(s), area(s) and the like which exist in the image data of the original document (unrevised document) but do not exist in the image data of the entry-added document (revised document) are not extracted since they are noise. Note that, the difference extraction technique is merely an example of the technique for extracting revision information, and the technique is not limited to the difference extraction technique.

The isolation elimination part 3046 eliminates isolated dot(s) in the difference extraction result from the difference extraction part 3045, as noise from the revision (additional entry) information, and outputs the information as final revision information (information on the revision area) In the isolation elimination part 3046, isolation elimination processing is performed based on a parameter determining the degree of noise determination.

(Extracted Area Specifying File)

Returning to FIG. 2, the extracted area specifying file generation part 305 generates a file specifying the revision area extracted by the revision area extraction part 304 (hereinbelow, referred to as an "extracted area specifying file"). The generated extracted area specifying file is stored into the database part 306. Next, an example of the extracted area specifying file will be described.

For example, an extracted area specifying file may be generated using only the extracted revision area as another file. More particularly, only the extracted revision area may be left on the existing page (document) (the other area than the revision area is deleted). Otherwise, in a document having plural pages handled in a series of processings, only a document (page) having the revision area may be left.

Otherwise, the color of the revision area may be different from that of the other area. For example, the color of the revision area may be turned red and the other area may be turned black. Otherwise, the revision area may be surrounded with a predetermined colored frame or a rectangle with background color. Otherwise, the revision area may be underlined with a predetermined color, or an electronic tag may be attached to the revision area. In these cases, the edition may be easily grasped by sequentially changing the colors of character, frame, background, underline, electronic tag and the like in the second and subsequent editions.

Returning to FIG. 2, the parameter setting part 307 sets parameters to change a degree of revision area extraction with respect to the revision area extraction part 304. As the parameters, for example, the respective parameters in the noise elimination parts 3041 and 3042, the expansion processing parts 3044 and the isolation elimination part 3046 shown in FIG. 3 may be used. As the degree of revision area extraction may be changed by arbitrarily setting these parameters, the extraction of revision area may be easily performed or performed with difficulty.

As the parameter setting part 307, for example, the operation part (not shown) operated by the user can be employed. In this case, the parameters to be set with respect to the revision area extraction part 304 are adjusted by the user's input operation from the operation part as the parameter setting part 306, based on the extracted area specifying file (as described later, a print-outputted or display-outputted extracted area specifying file) generated by the extracted area specifying file generation part 305.

Note that the operation of the parameter setting part 307 is not limited to the user's manual parameter setting (adjusting), but automatic parameter setting may be used. More particularly, a test chart may be processed in advance, then the parameters may be automatically adjusted so as to obtain the same extraction result as that of additional entry (revision) in the test chart.

Otherwise, the test chart may be processed in advance, then the parameters may be automatically adjusted so as to obtain an extraction result at a level equivalent or higher (there is no extraction omission of entry-added portion) that of additional entry (revision) in the test chart (excessive extraction is allowable). Otherwise, the test chart may be processed in advance, the parameters may be automatically adjusted so as to obtain an extraction result at a level equivalent to or lower than (there is no extraction other than the additionally inscribed portion) that of additional entry (revision) in the test chart (extraction omission is allowable).

The data correction part 308 obtains data of entry information on entry in an unrevised document based on the image data of the unrevised document stored in the first image memory 301. The entry information means information described in the original document to be filled-out, and information entered (entry added) in the revised document from the first and subsequent editions where the revision has been performed. The data position calculation part 309 calculates the position of the entry information on the unrevised document, as data, based on the image data of the unrevised document stored in the first image memory 301.

The data linking part 310 links the entry information obtained as data by the data correction part 308 with the position information calculated as data by the data position calculation part 309, and stores the linked data into the database part 306, by each unrevised document. Note that in a case where the entry information and its position information are obtained, when there is an original document yet to be filled out, the entry information and its position information can be more reliably obtained by comparison with the original document.

The data correction part 311 obtains the additional entry information (revision area) extracted by the revision area extraction part 304 from the revised document, as data. The data position calculation part 312 calculates the position of the additional entry information extracted by the revision area extraction part 304 from the revised document, on the document, as data. The data correction part 313 automatically corrects entry information in the position corresponding to the position of the additional entry information, with respect to the corresponding unrevised document stored in the database part 306, to the additional entry information, based on the additional entry information obtained by the data correction part 311 as data and the position information on the additional entry information calculated by the data position calculation part 312, and stores the corrected document, as image data of revised document, into the database part 306.

The image output part 40 corresponds to an image forming part (printer) of the multifunction device 5 or a display of the PC 4 in FIG. 1. The image output part 40 print-outputs the extracted area specifying file generated by the extracted area specifying file generation part 305 and stored in the database part 306, or the image data of the revised document corrected by the data correction part 313 and stored in the database part 306, onto paper, or display-outputs the file or image data to a display.

The image processing apparatus having the above construction (in this example, corresponds to the image processing apparatus 6 on the company B side in FIG. 1) enables manual correction processing for the user's checking an extracted area specifying file generated by using a revision area extracted from a revised document revised by the image processing apparatus 3 on the company A side and manually correcting a portion corresponding to the revision area, and automatic correction processing for automatically correcting the portion corresponding to the revision area based on the revision area extracted from the revised document thereby generating a final corrected document.

In the manual correction processing, the revision area extraction part 304 compares image data of an unrevised document designated by the corresponding document image designation part 303 with image data of a revised document and extracts a revision area. Then the extracted area specifying file generation part 305 generates an extracted area specifying file specifying the revision area, and the image output part 40 print outs or displays the extracted area specifying file via e.g. the database part 306 (or without the database part 306). The user checks the print output or display output and performs correction input only for the information on the revision area from a keyboard of the PC 4.

In the automatic correction processing, by the operations of the data correction part 308, the data position calculation part 309 and the data linking part 310 (corresponding to the linking unit in the claims), entry information on the unrevised document as data and the position information on the document from the image data of the unrevised document are obtained, then the data is linked with the position of the entry information and stored into the database part 306. On the other hand, when the revision area extraction part 304 extracts the revision area from the image data of the revised document, by the operations of the data correction part 311, the data position calculation part 312 and the data correction part 313 (corresponding to the correction unit in the claims), the position of the revision area is grasped, then the entry information on the unrevised document stored in the database part 306 corresponding to the revision area is automatically corrected to information on the extracted revision area, and a revision extracted document is generated.

Note that in the above exemplary embodiment, the image reading part (scanner) of the multifunction device 5 in FIG. 1 is used as the first image input part 10. The image input part 10 reads an unrevised document and stores the image data into the first image memory 301. However, it may be arranged such that a document file is generated using application software such as Microsoft Word or Power Point (both by Microsoft Corporation) by the PC 4 in FIG. 1 as the first image input part (first file input part) 10 and the document file is stored into the first image memory (first file memory) 301.

In this case, a document file is inputted from the second image input part (second file input part) 20 into the second image memory (second file memory) 302. For example, in FIG. 1, a document file as an unrevised document is transmitted from the company B to the company A via the network 7. The company A performs revision by the PC 1 on the unrevised document received from the company B. The document file of the revised document is transmitted from the company A to the company B via the network 7. The second file input part 20 as a communication unit receives the document file of the revised document and inputs it into the second file memory 302.

Further, in the above exemplary embodiment, the first image memory (first file memory) 301 to store the first image data of an unrevised document (first document file) and the second image memory (second file memory) 302 to store the second image data of a revised document are constituent elements of the image data processing part 30, however, it may be arranged such that, as the first and second image memories (first and second file memories) 301 and 302, e.g. a file server connected with the network 7 and communicable with the image processing apparatuses 3 and 6 is used, and the first image data of the unrevised document (first document file) and the second image data of the revised document (second document file) are stored in the file server.

The respective constituent elements of the image data processing part 30 in the image processing apparatus having the above construction, i.e., the first and second image memories 301 and 302, the corresponding document image designation part 303, the revision area extraction part 304, the extracted area specifying file generation part 305, the database part 306, the parameter setting part 307, the data correction part 308, the data position calculation part 309, the data linking part 310, the data correction part 311, the data position calculation part 312 and the data correction part 313, may be realized by a software structure utilizing a computer device such as a PC (personal computer) to execute respective functions such as information storage processing, image processing, calculation processing and the like by execution of a predetermined program.

Note that the realization of the above constituent elements is not limited by realization by a software structure, but may be realized by a hardware structure or a combination of hardware and software. When the constituent elements are realized by a software structure, a program to cause a computer to function as the first and second image memories 301 and 302, the corresponding document image designation part 303, the revision area execution part 304, the extracted area specifying file generation part 305, the database part 306, the parameter setting part 307, the data correction part 308, the data position calculation part 309, the data linking part 310, the data correction part 311, the data position calculation part 312 and the data correction part 313, is the image processing program according to the present invention.

Further, it can be said that a program to execute processings at the respective process steps in the following processing sequence is the image processing program according to the present invention. The image processing program may be installed in the computer in advance. However, when the program is not installed in advance, it may be stored in a computer readable storage medium and the medium may be provided, otherwise, the program may be delivered via a cable or wireless communication unit.

[Revision Extracted Document Generation Processing]

Next, an example of processing of extracting a revision area, correcting entry information on an unrevised document to information on revision area and generating a revision extracted document will be described with reference to the flowchart of FIG. 4.

In this example, a document file has plural pages (plural documents). Further, first-edition completed document files, classified by file, are stored in the first file memory (first image memory) 301. At this time, predetermined file names are assigned to the document files.

The file names may be given, for example, in the following manners.

1) An arbitrary file name is given by a user's designation.
2) A file name similar to an unrevised document (yet-to-be-filled-out original document) is given. For example, when an unrevised document has a file name "ID1001-1", the file name of the revised document is "ID1001-2".
3) A file name is given based on code information included in the image of a document file. For example, when the code information is "2001" and the revised document is the second edition, the file name is "2001-2".
4) The image of a document file itself is used as a file name.

Figure 4:
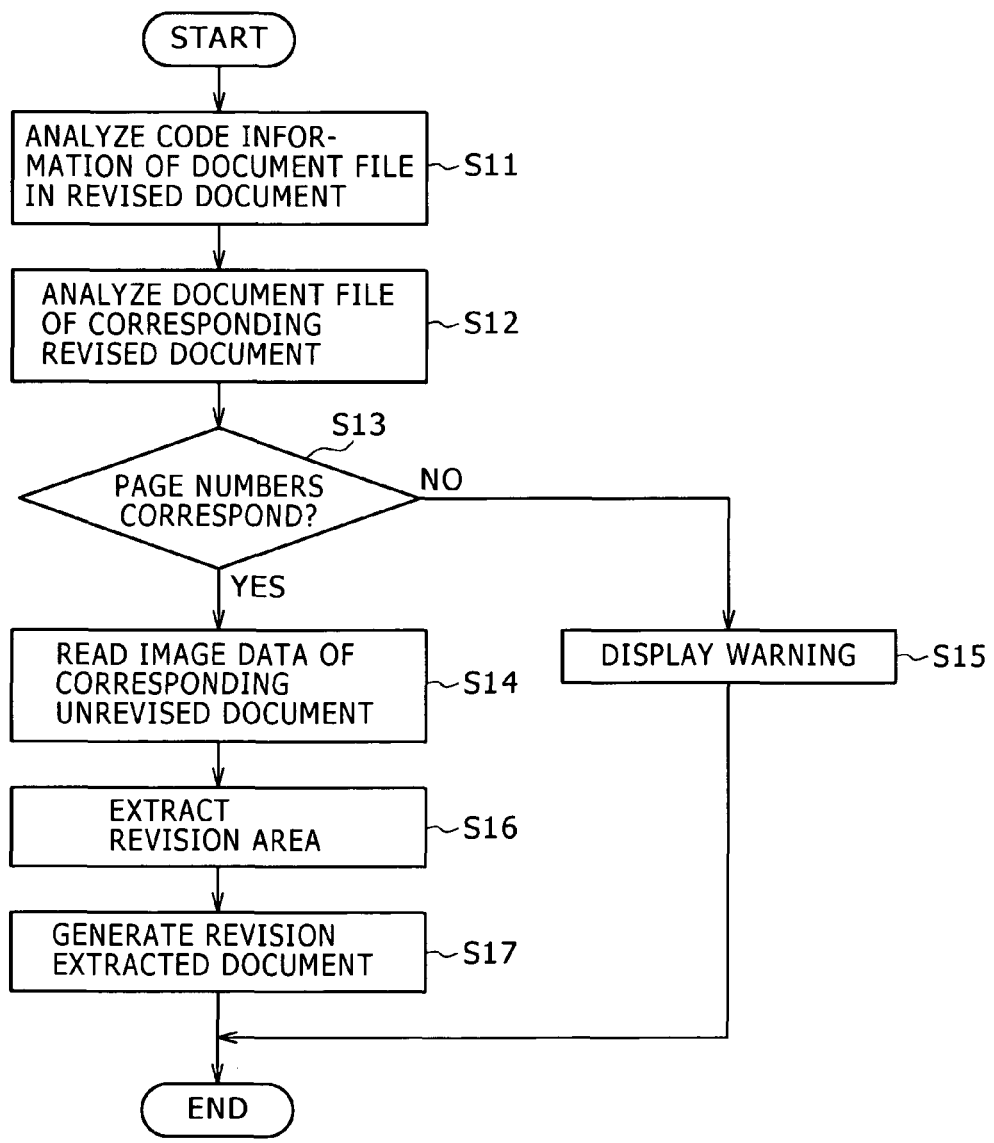
FIG. 4 is a flowchart showing processing of generating a revision extracted document.

In the flowchart of FIG. 4, when a revised document has been obtained as a document file (electronic file) and stored into the second file memory (second image memory) 302, code information included in the document file is analyzed (step S11). Next, a document file of an unrevised document corresponding to the document file of the revised document is obtained from the first file memory (first image memory) 301 (step S12).

Next, the page numbers of the both files of the revised document and unrevised document are compared with each other and it is determined whether or not they are the same with each other (step S13). If it is determined that the page numbers are the same with each other, image data of the unrevised document corresponding to the document file of the revised document is read (step S14). The processing at steps S11 to S14 corresponds to the processing in the corresponding document image designation part 303 in FIG. 2. If the page numbers are not the same with each other, a warning, for example, is displayed (step S15), and the present processing is stopped.

In this example, when the page numbers are not the same with each other, a warning is displayed and the processing is stopped. However, the following operation may be performed. That is, by utilizing page numbers, pages having the same page number may be set as corresponding documents. Further, by utilizing titles or keywords included in a page, pages having the same title or keyword may be set as corresponding documents. Otherwise, image comparison may be performed, and pages having an equal feature amount may be set as corresponding documents.

Next, when the image data of the unrevised document corresponding to the document file of the revised document has been read, the image data of the revised document is compared with the image data of the unrevised document corresponding to the image data of the revised document, thereby a revision area is extracted from the revised document (step S16). The processing at step S16 corresponds to the processing in the revision area extraction part 304 in FIG. 2.

Next, the position of the extracted revision area is grasped, then entry information on the unrevised document corresponding to the revision area is corrected to information on the extracted revision area, thereby a revision extracted document is generated and stored in the database part 306 (step S17). The processing at step S17 corresponds to the processing in the data correction part 311, the data position calculation part 312 and the data correction part 313 in FIG. 2.

In the above-described series of processing sequence, the automatic correction processing is performed. However, in the case of manual correction, an extracted area specifying file specifying the revision area extracted at step S16 is generated, and the extracted area specifying file is print-outputted or display-outputted by the image output part 40. Then the user checks the print output or display output, and makes correction input of only the information on the revision area from the keyboard of the PC 4, thus generates a revision extracted document.

Figure 5:
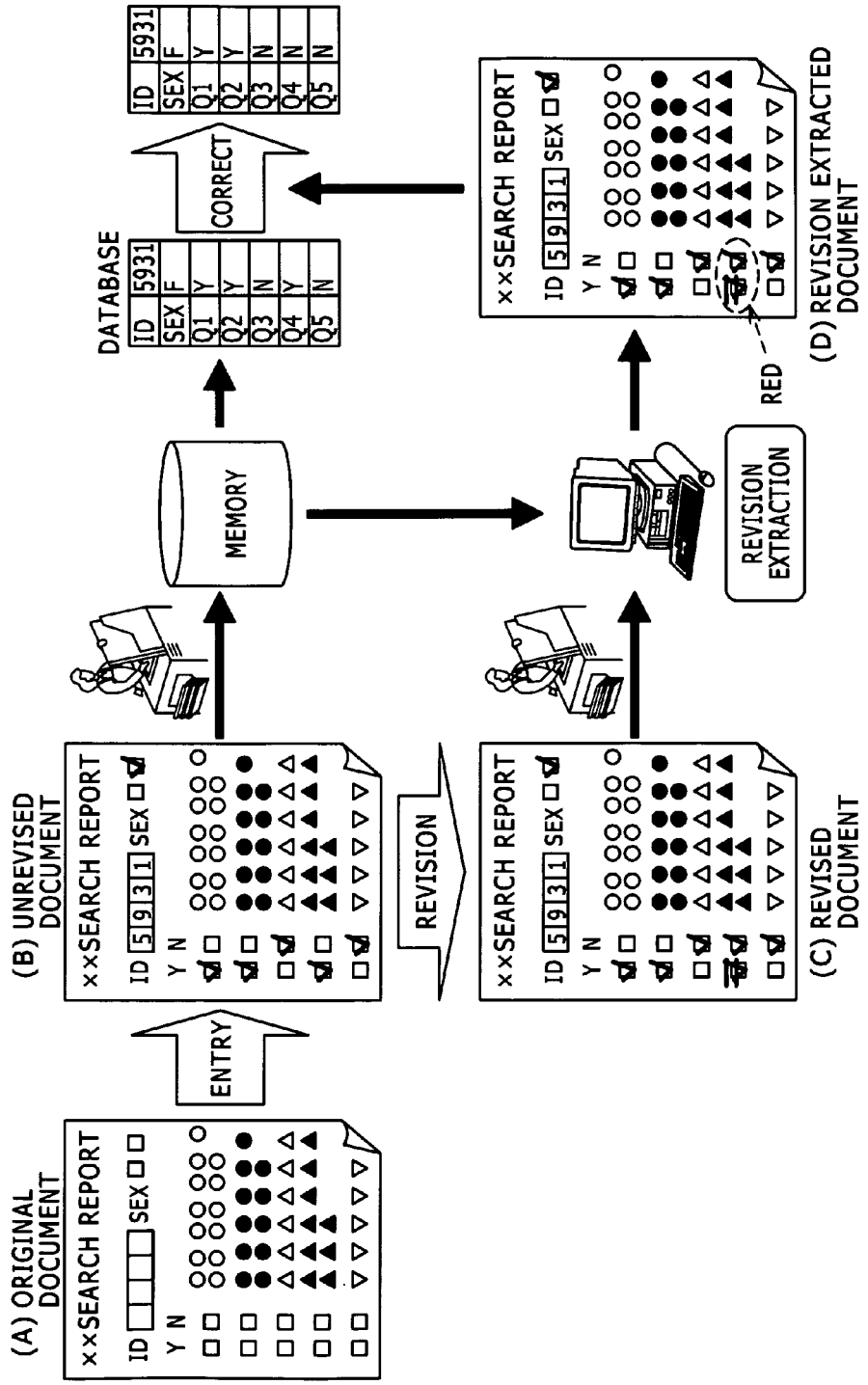
FIG. 5 is a conceptual diagram showing the flow of processing in a particular example of generation of the revision extracted document.

FIG. 5 is a conceptual diagram showing the flow of processing in a particular example of generation of the revision extraction document. In this example, entry is performed on a yet-to-be-filled-out original document (A) once, and revision is performed on the once-completed unrevised document (B). At this time, a revision area is extracted from the unrevised document (B) and its revised document (C), and a revision extracted document (D) is generated. Further, the data of the revised portion, in entry information database generated by reading input data from the unrevised document (B), is corrected by utilizing the revision extracted document (D).

As an example, when the company B requests the company A to generate a search report, the following case can be considered. The company A makes a hand-write entry into the yet-to-be-filled-out search report, i.e., an original document (A) with a search result (search data) and provides an unrevised document (B) to the company B. The company B checks the content of the entry in the unrevised document (B), and when there are points to be corrected, insufficient points or omission, returns the search report to the company A. Then, the company A performs revision on the search report returned from the company B, i.e., the unrevised document (B), and again sends the document as a revised document (C) to the company B. This transmission/reception is repeated until the company B determines that there are no points to be corrected, insufficient points or omission.

In this case, conventionally, since it is impossible on the company B side to grasp the revised portion on the company A side, all the entry information (all the search data) of first edition, second edition, . . . of the unrevised document (B) and the revised document (C) sent from the company A is manually inputted into a computer upon each reception of data from the company A. Thus the workability is very low.

On the other hand, as the unrevised document (B) is compared with the revised document (C) thereby a revision area is extracted and the revision extracted document (D) is generated, the revised portion in the revised document (C) can be clearly specified for the operator using the revision extracted document (D). In this arrangement, it is not necessary for the operator to re-input all the entry information in the revised document (C). As a database where additional correction has been made can be generated by re-inputting only the information on the revised portion, the workability upon re-input can be greatly improved. In the revision extracted document (D) the revision information is represented in, e.g., red.

Note that in addition to manual correction, automatic correction may be employed. In this case, when the revision area is extracted from the image data of the revised document (C) and the revision extracted document (D) is generated, the position of the revision area is grasped, and the entry information on the unrevised document (B) corresponding to the revision area is automatically corrected to information on the extracted revision area and the database is generated.

[Exemplary Embodiment of Revision]

Next, an exemplary embodiment of revision (additional entry and correction) will be described. As the exemplary embodiment of revision, hand-write additional entry on a paper document, and in consideration of use of electronic document file such as a PDF (Portable Document Format) file, electronic additional entry by revision using a mouse, revision using an electronic pen on a tablet PC, are available. Further, various processing patterns may be considered regarding the hand-write additional entry and the electronic additional entry.

Hereinbelow, the flow of the respective processing patterns of the hand-write additional entry and the electronic additional entry will be described with reference to FIGS. 1 and 2.

In this example, the company A makes an entry into in a search report (unrevised document) provided from the company B with a search result, and on the other hand, in the series of processings on the company B side to manually input the search result in the completed search report (revised document) into the PC, when there are points to be corrected, insufficient points or omission, the search report is returned to the company A. The company A performs revision on the search report returned from the company B (unrevised document), and the information on the revision in the revised search report (revised document) is manually inputted into the PC on the company B side.

Upon input of revision information into the PC, the image output part 40 print-outputs or display-outputs an extracted area specifying file generated by the extracted area specifying file generation part 305. The user checks the result of output, and performs manual input from the keyboard of the PC (the above-described manual correction processing). Note that the input is not limited to the input by the manual correction processing, but automatic input by the above-described automatic correction processing may be performed.

Hereinbelow, the flow from the start of correction processing to the processing by the revision area extraction part 304 common to the manual correction processing and the automatic correction processing will be described.

(Hand-Write Additional Entry Processing Pattern 1)

Figure 6:
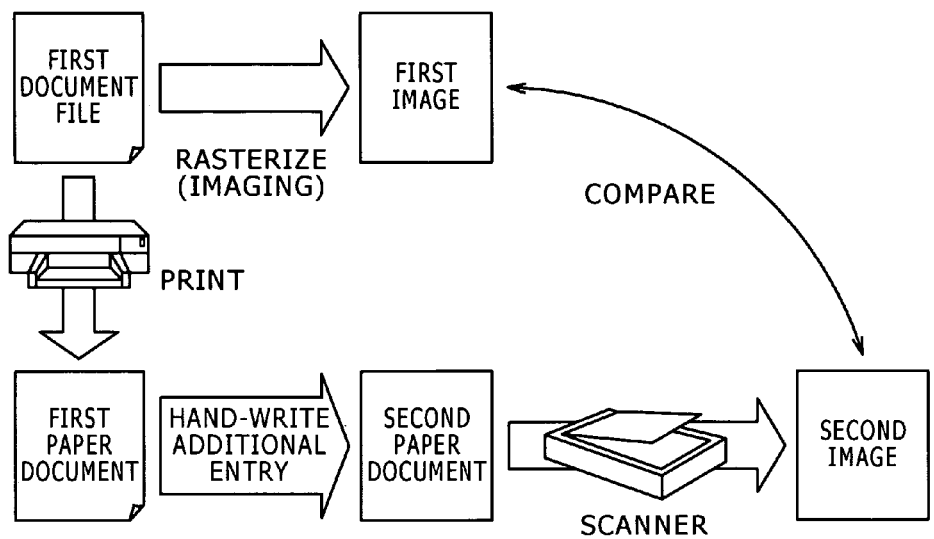
FIG. 6 is a conceptual diagram showing a hand-write additional entry processing pattern 1.

FIG. 6 is a conceptual diagram showing a hand-write additional entry processing pattern 1. In the hand-write additional entry processing pattern 1, the company B checks the search report with entry of the search result sent from the company A, and when there are points to be corrected, insufficient points or omission, a document file of the search report (unrevised document), as a first document file, is rasterized (subjected to imaging), then stored as image data of the unrevised document (first image data) into the first image memory 301, and returned to the company A.

When the search report is returned from the company B to the company A, the first document file may be print-outputted as a paper document by the image forming part (printer) of the multifunction device 5 of the company B, and sent as a first paper document to the company A via mail or FAX. Otherwise, the first document file may be transmitted via the network 7 or via a storage medium such as a CD-ROM to the company A. In this case, the first document file is print-outputted by the image forming part (printer) of the multifunction device 2 of the company A, thereby the first paper document is obtained.

On the company A side, regarding the first paper document (unrevised document), revision is performed by hand-write additional entry on the points to be corrected, insufficient data or omission, as a second paper document (revised document). Then, when the second paper document is sent from the company A to the company B, the second paper document may be read by the image reading part (scanner) of the multifunction device 2 of the company A so as to obtain image data, and the image data may be transmitted via the network 7 or a storage medium to the company B. Otherwise, the second paper document may be sent via mail or FAX, and the sent document may be read by the image reading part (scanner) of the multifunction device 5 of the company B so as to obtain image data.

The image data of the second paper document (revised document) sent by any way to the company B is stored as second image data into the second image memory 302. Then, by the operations of the corresponding document image designation part 303 and the revision area extraction part 304, the image data of the unrevised document as the first image data is compared with the image data of the revised document as the second image data, thereby a revision area is extracted.

(Hand-Write Additional Entry Processing Pattern 2)

Figure 7:
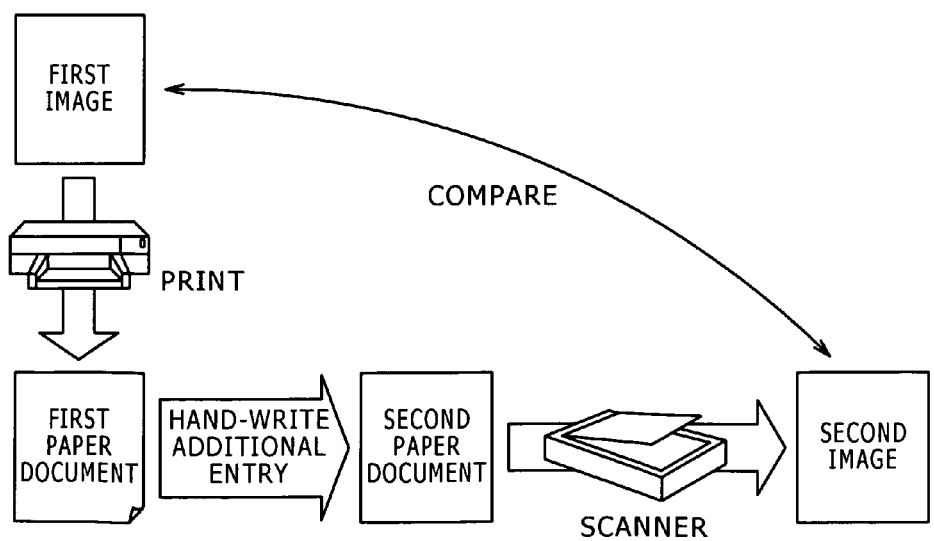
FIG. 7 is a conceptual diagram showing a hand-write additional entry processing pattern 2.

FIG. 7 is a conceptual diagram showing a hand-write additional entry processing pattern 2. In the hand-write additional entry processing pattern 2, the company B checks the search report with entry of search result, sent from the company A, and when there are points to be corrected, insufficient points of the data or omission, the search report (unrevised document) is stored as image data of the unrevised document (first image data) into the first image memory 301, and the search report is returned to the company A.

When the search report is returned from the company B to the company A, the first image data may be print-outputted as a paper document by the image forming part of the multifunction device 5 of the company B, and sent as a first paper document to the company A via mail or FAX. Otherwise, the first document file may be transmitted via the network 7 or via a storage medium such as a CD-ROM to the company A. In this case, the first document file is print-outputted by the image forming part of the multifunction device 2 of the company A, thereby the first paper document is obtained.

On the company A side, regarding the first paper document (unrevised document), revision is performed by hand-write additional entry on the points to be corrected, insufficient data or omission, as a second paper document (revised document). Then, when the second paper document is sent from the company A to the company B, the second paper document may be read by the image reading part of the multifunction device 2 of the company A so as to obtain image data, and the image data may be transmitted via the network 7 or a storage medium to the company B. Otherwise, the second paper document may be sent via mail or FAX and the sent document may be read by the image reading part of the multifunction device 5 of the company B so as to obtain image data.

The image data of the second paper document (revised document) sent by any way to the company B is stored as second image data into the second image memory 302. Then, by the operations of the corresponding document image designation part 303 and the revision area extraction part 304, the image data of the unrevised document as the first image data is compared with the image data of the revised document as the second image data, thereby a revision area is extracted.

(Hand-Write Additional Entry Processing Pattern 3)

Figure 8:
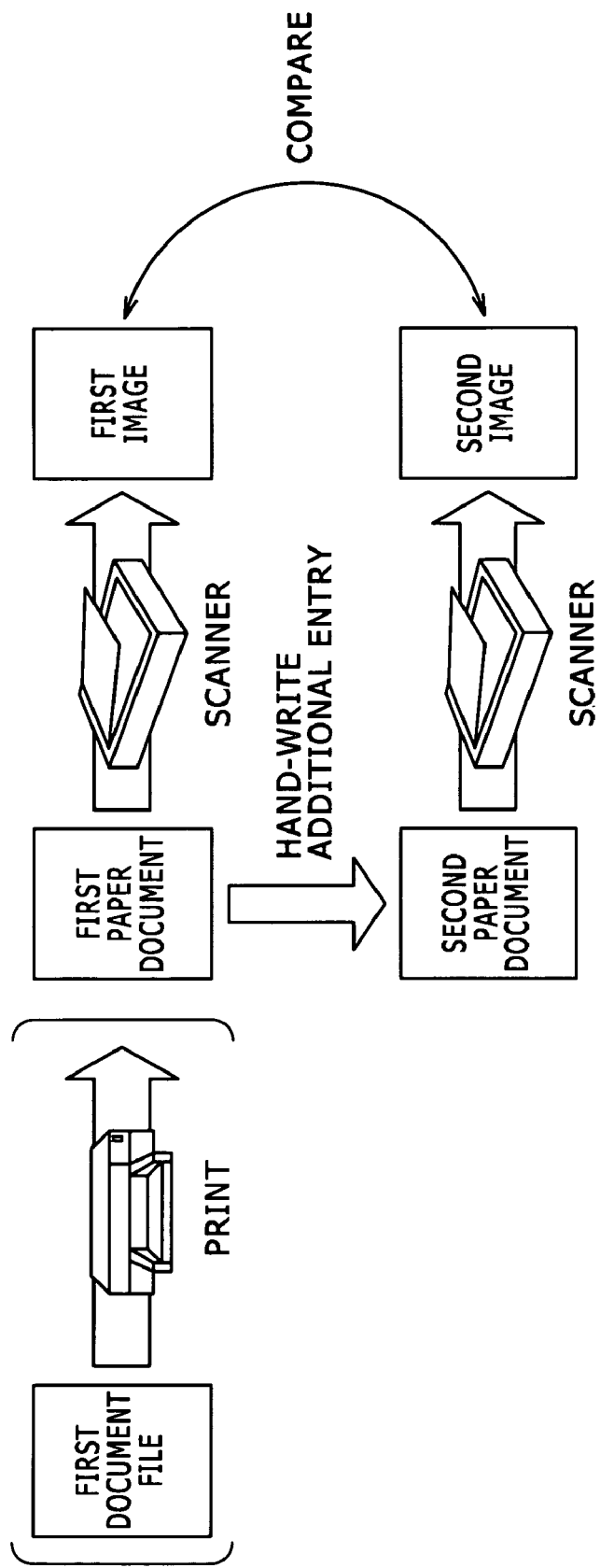
FIG. 8 is a conceptual diagram showing a hand-write additional entry processing pattern 3.

FIG. 8 is a conceptual diagram showing a hand-write additional entry processing pattern 3. In the case of the hand-write additional entry processing pattern 3, the company B checks the search report with entry of search result, sent from the company A, and when there are points to be corrected, insufficient points of the data or omission, the document file of the search report (unrevised document) as a first document file is print-outputted by the image forming part of the multifunction device 5 of the company B, as a first paper document. The first paper document is read by the image reading part of the multifunction device 5 of the company B, as first image data, then stored into the first image memory 301, and the first paper document is returned to the company A via mail or FAX.

On the company A side, regarding the first paper document (unrevised document) returned from the company B, revision is performed by hand-write additional entry on the points to be corrected, insufficient data or omission, as a second paper document (revised document). Then, when the second paper document is sent from the company A to the company B, the second paper document may be read by the image reading part of the multifunction device 2 of the company A so as to obtain image data, and the image data may be transmitted via the network 7 or a storage medium to the company B. Otherwise, the second paper document may be sent via mail or FAX and the sent document may be read by the image reading part of the multifunction device 5 of the company B so as to obtain image data.

The image data of the second paper document (revised document) sent by any way to the company B is stored as second image data into the second image memory 302. Then, by the operations of the corresponding document image designation part 303 and the revision area extraction part 304, the image data of the unrevised document as the first image data is compared with the image data of the revised document as the second image data, thereby a revision area is extracted.

(Electronic Additional Entry Processing Pattern 1)

Figure 9:
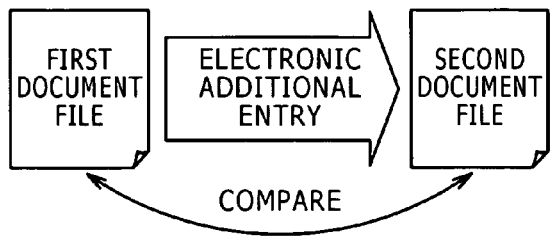
FIG. 9 is a conceptual diagram showing an electronic additional entry processing pattern 1.

FIG. 9 is a conceptual diagram showing an electronic additional entry processing pattern 1. In the electronic additional entry processing pattern 1, the company B checks the search report with entry of search result, sent from the company A, and when there are points to be corrected, insufficient points of the data or omission, the document file of the search report (unrevised document) is stored as a first document file into the first image memory (first file memory) 301, and the first document file is returned to the company A via the network 7 or a storage medium such as a CD-ROM.

On the company A side, regarding the first document file (unrevised document), revision is performed by electronic additional entry on the points to be corrected, insufficient data or omission, then, a second document file (revised document) after the revision is sent via the network 7 or a storage medium to the company B. The second document file is stored into the second image memory (second file memory) 302. Then, by the operations of the corresponding document image designation part 303 and the revision area extraction part 304, the document file of the unrevised document as the first document file is compared with the document file of the revised document as the second document file, thereby a revision area is extracted.

(Electronic Additional Entry Processing Pattern 2)

Figure 10:
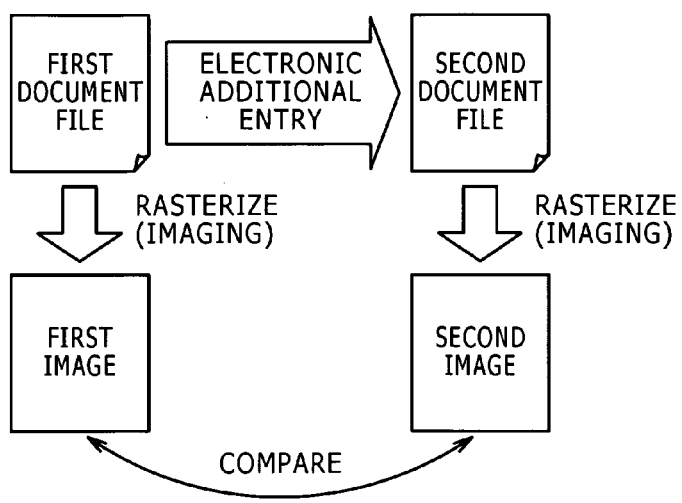
FIG. 10 is a conceptual diagram showing an electronic additional entry processing pattern 2.

FIG. 10 is a conceptual diagram showing an example of processing of an electronic additional entry processing pattern 2. In the electronic additional entry processing pattern 2, the company B checks the search report with entry of search result, sent from the company A, and when there are points to be corrected, insufficient points of the data or omission, the document file of the search report (unrevised document), as a first document file, is rasterized and stored as image data of the unrevised document (first image data) into the first image memory 301, and the first document file is returned to the company A via the network 7 or a storage medium such as a CD-ROM.

On the company A side, regarding the first document file (unrevised document), revision is performed by electronic additional entry on the points to be corrected, insufficient data or omission, then, a second document file (revised document) after the revision is sent via the network 7 or a storage medium to the company B. The second document file is rasterized and stored as second image data into the second image memory 302. Then, by the operations of the corresponding document image designation part 303 and the revision area extraction part 304, the image data of the unrevised document as the first image data is compared with the image data of the revised document as the second image data, thereby a revision area is extracted.

(Electronic Additional Entry Processing Pattern 3)

Figure 11:
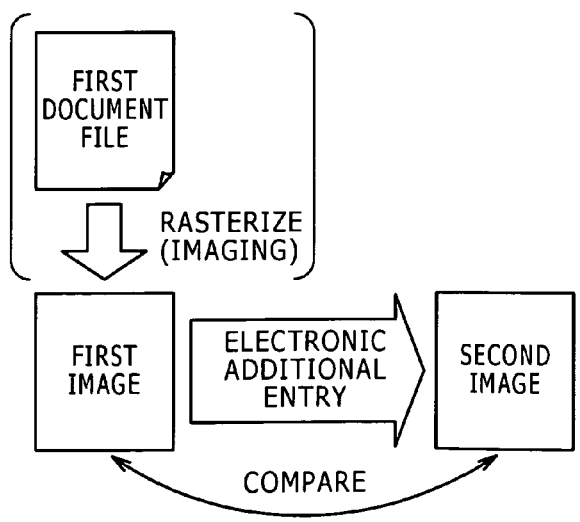
FIG. 11 is a conceptual diagram showing an electronic additional entry processing pattern 3.

FIG. 11 is a conceptual diagram showing an electronic additional entry processing pattern 3. In the electronic additional entry processing pattern 3, the company B checks the search report with entry of search result, sent from the company A, and when there are points to be corrected, insufficient points of the data or omission, the document file of the search report (unrevised document), as a first document file, is rasterized and stored as image data of the unrevised document (first image data) into the first image memory 301, and the first image data is returned to the company A via the network 7 or a storage medium such as a CD-ROM.

On the company A side, regarding the first image data (unrevised document), revision is performed by electronic additional entry on the points to be corrected, insufficient data or omission, then, second image data (revised document) after the revision is sent via the network 7 or a storage medium to the company B. The second image data is stored into the second image memory 302. Then, by the operations of the corresponding document image designation part 303 and the revision area extraction part 304, the image data of the unrevised document as the first image data is compared with the image data of the revised document as the second image data, thereby a revision area is extracted.

(Electronic Additional Entry Processing Pattern 4)

FIG. 12 is a conceptual diagram showing an electronic additional entry processing pattern 4. In the electronic additional entry processing pattern 4, the company B checks the search report with entry of search result, sent from the company A, and when there are points to be corrected, insufficient points of the data or omission, the document file of the search report (unrevised document), as a first document file, is print-outputted by the image forming part of the multifunction device 5 of the company B as a first paper document. The first paper document is read by the image reading part of the multifunction device 5 of the company B as first image data, then stored into the first image memory 301, and the first image data is returned to the company A via the network 7 or a storage medium such as a CD-ROM.

On the company A side, regarding the first image data (unrevised document), revision is performed by electronic additional entry on the points to be corrected, insufficient data or omission, then, second image data (revised document) after the revision is sent via the network 7 or a storage medium to the company B. The second image data is stored into the second image memory 302. Then, by the operations of the corresponding document image designation-part 303 and the revision area extraction part 304, the image data of the unrevised document as the first image data is compared with the image data of the revised document as the second image data, thereby a revision area is extracted.

Note that in the above exemplary embodiment, image processing for, when the company B requests the company A to generate a search report, inputting a search result (search data) and generating a revision extracted document has been described. However, this application is merely an example. The present invention is applicable to general image processing for generating a revision extracted document based on an unrevised document and a revised document.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
a first memory that stores a first document file;
a second memory that stores a second document file obtained by revising the first document file;
an extraction unit that extracts a revised area of the second document file based on the first document file corresponding to the second document file and the second document file; and an extracted area specifying file generation unit that generates a file specifying the revision area extracted by the extraction unit, wherein an appearance of the revision area is changed on the generated file.

2. An image processing apparatus, comprising:
a first memory that stores a first document file;
a linking unit that obtains entered information of the first document file and information on a position of the entered information, and stores the obtained information in association with each other in a database part;
a second memory that stores a second document file obtained by revising the first document file;
an extraction unit that extracts a revised area of the second document file based on the first document file corresponding to the second document file and the second document file; and
a correction unit that obtains information on a position of the revised area, and corrects the entered information of the first document file, which is stored in the database part and is corresponding to the information on the position of the revised area, to entered information on the revised area.

3. The image processing apparatus according to claim 1, further comprising a parameter setting unit that sets a parameter to determine an extraction degree of the revised area in the extraction unit.

4. The image processing apparatus according to claim 1, wherein:
the first document file and the second document file are obtained by scanning paper documents.

5. The image processing apparatus according to claim 2, wherein:
the first document file and the second document file are obtained by scanning paper documents.

6. The image processing apparatus according to claim 1, wherein:
the second document file is obtained by scanning a paper document.

7. The image processing apparatus according to claim 2, wherein:
the second document file is obtained by scanning a paper document.

8. The image processing apparatus according to claim 1, further comprising:
a corresponding document file designation unit that designates the first document file in the first memory corresponding to the second document file in the second memory.

9. The image processing apparatus according to claim 2, further comprising:
a corresponding document file designation unit that designates the first document file in the first memory corresponding to the second document file in the second memory.

10. An image processing method, comprising the steps of:
storing a first document file;
storing a second document file obtained by revising the first document file;
extracting a revised area of the second document file based on the first document file corresponding to the second document file and the second document file; and
generating a file specifying the revised area, wherein an appearance of the revision area is changed on the generated file, and
wherein at least one of the steps is executed using a processor.

11. An image processing method, comprising the steps of:
storing a first document file;
obtaining entered information of the first document file and information on a position of the entered information;
storing the obtained information in association with each other;
storing a second document file obtained by revising the first document file;
extracting a revised area of the second document file based on the first document file corresponding to the second document file and the second document file;
obtaining information on a position of the revised area; and
correcting the entered information of the first document file, which is stored and corresponding to the information on the position of the revised area, to entered information on the revised area, wherein at least one of the steps is executed using a processor.

12. The image processing method according to claim 10, wherein:
the first document file and the second document file are obtained by scanning paper documents.

13. The image processing method according to claim 11, wherein:
the first document file and the second document file are obtained by scanning paper documents.

14. The image processing method according to claim 10, wherein:
the second document file is obtained by scanning a paper document.

15. The image processing method according to claim 11, wherein:
the second document file is obtained by scanning a paper document.

16. The image processing method according to claim 10, further comprising:
designating the first document file corresponding to the second document file.

17. The image processing method according to claim 11, further comprising:
designating the first document file corresponding to the second document file.

18. A computer readable medium storing a program causing a computer to execute a process for image processing, the process comprising:
storing a first document file;
storing a second document file obtained by revising the first document file;
extracting a revised area of the second document file based on the first document file corresponding to the second document file and the second document file; and
generating a file specifying the revised area, wherein an appearance of the revision area is changed on the generated file.

19. A computer readable medium storing a program causing a computer to execute a process for image processing, the process comprising:
storing a first document file;
obtaining entered information of the first document file and information on a position of the entered information;
storing the obtained information in association with each other;

storing a second document file obtained by revising the first document file;

extracting a revised area of the second document file based on the first document file corresponding to the second document file and the second document file;

obtaining information on a position of the revised area; and correcting the entered information of the first document file, which is stored and corresponding to the information on the position of the revised area, to entered information on the revised area.

20. The computer readable medium storing a program according to claim 18, the process further comprising:

designating the first document file corresponding to the second document file.

21. The computer readable medium storing a program according to claim 19, the process further comprising:

designating the first document file corresponding to the second document file.

* * * * *